United States Patent [19]

Cavazza

[11] 4,221,518
[45] Sep. 9, 1980

[54] METHOD AND APPARATUS FOR STACKING AND TRANSFERRING PACKETS

[75] Inventor: Roberto Cavazza, Croce di Casalecchio di Reno, Italy

[73] Assignee: CIR - S.p.A. - Divisione Sasib, Bologna, Italy

[21] Appl. No.: 12,103

[22] Filed: Feb. 14, 1979

[30] Foreign Application Priority Data

Feb. 16, 1978 [IT] Italy .................. 12479 A/78

[51] Int. Cl.³ .......................... B65G 57/30
[52] U.S. Cl. .................... 414/46; 198/347; 414/37; 414/89; 414/96; 414/786; 414/115
[58] Field of Search ............ 414/29, 37, 46, 52, 414/69, 89, 92, 96, 115, 786; 198/347

[56] References Cited

U.S. PATENT DOCUMENTS

| | | | |
|---|---|---|---|
| 2,897,949 | 8/1959 | Huisking | 414/96 X |
| 3,340,992 | 9/1967 | Seragnoli | 198/347 |
| 3,342,350 | 9/1967 | Seragnoli | 414/96 X |
| 3,352,435 | 11/1967 | Reinecke | 414/89 |
| 3,844,423 | 10/1974 | Loomer et al. | 414/96 |

FOREIGN PATENT DOCUMENTS 774928 5/1957 United Kingdom ............ 414/96

Primary Examiner—L. J. Paperner
Attorney, Agent, or Firm—Spencer & Kaye

[57] ABSTRACT

The stacking apparatus comprises a vertically movable stacking plunger which receives laterally the packets and feeds them, the one after the other, to an overlying vertical magazine, so as to build a pile of superposed packets which is supported by a lower packet-support arranged in correspondence of the bottom end of the magazine, and comprises also a transferring plunger movable to-and-fro in horizontal direction through the said vertical magazine. The transferring plunger presents a pusher head which extends for a height of "N" packets above the lower packet-support, while an upper packet-support is provided arranged at the height of "N−1" packets above the lower packet-support. At each stack-forming stroke, the transferring plunger pushes sidewise out of the vertical magazine a pile of "N" packets, consisting of "N−1" packets located in the magazine between the lower and the upper packet-support, plus one packet from the packet reserve resting over the upper packet-support.

5 Claims, 3 Drawing Figures

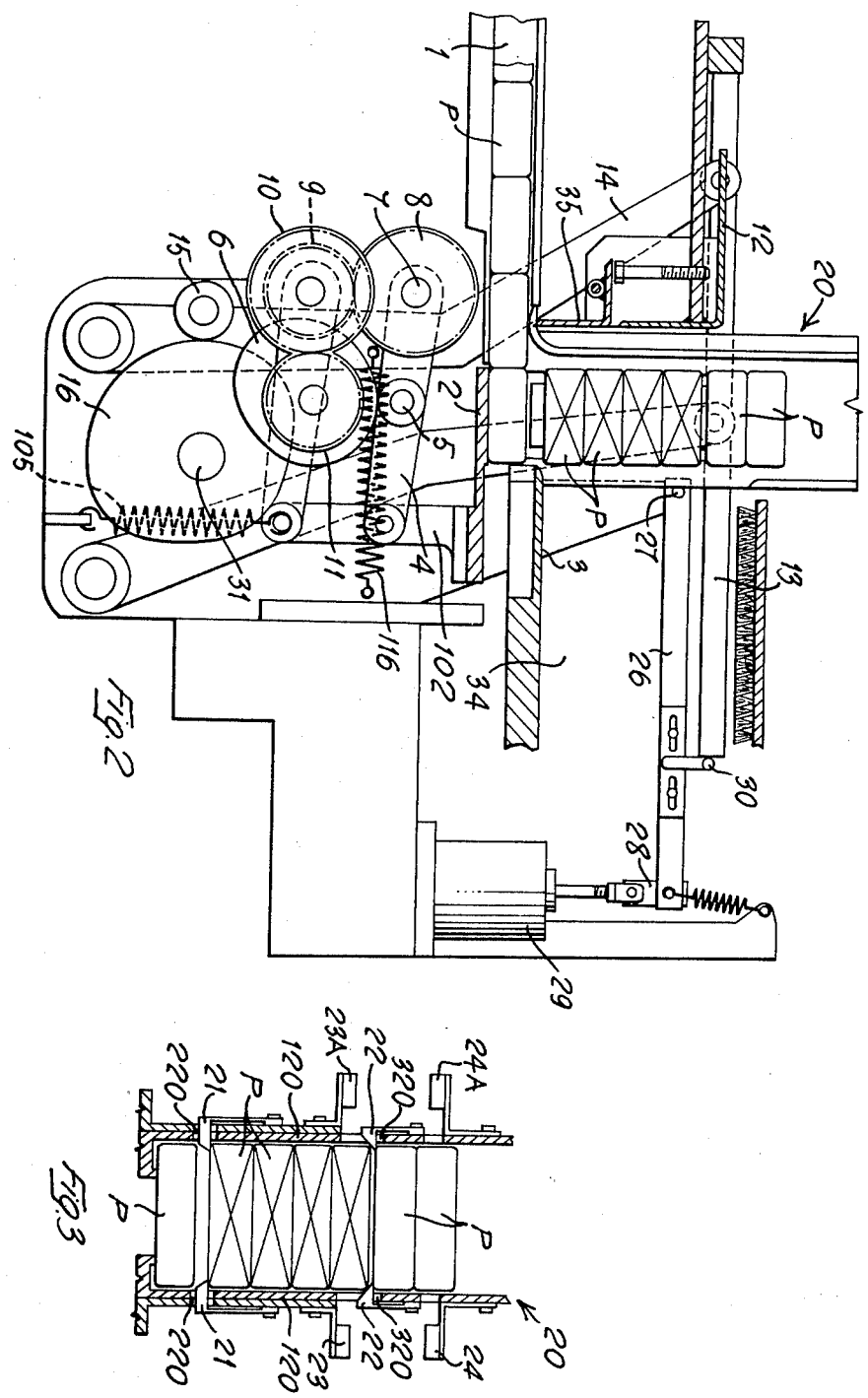

METHOD AND APPARATUS FOR STACKING AND TRANSFERRING PACKETS

BACKGROUND AND SUMMARY OF THE INVENTION

This invention relates to the handling of articles and, more particularly, it has for its object a method and apparatus for sequentially forming numbered stacks of regular articles, such as cigarette packs and the like.

Stack forming devices for cigarette packs have already been proposed, in which a pusher plunger engages and pushes one after the other the packs fed in a row along a track, until a stack of a preset number of packs is formed; this stack is then transferred to a delivery channel by a transferring plunger, which operates every time that a preset number of pusher plunger strokes has been effected.

In these known devices there is the inconvenience that, due to feed failures or the like, the transferred stacks are not always complete. This involves the necessity of checking the stacks in height after the transfer, and to provide means to deviate the incomplete stacks for rejection. On the other hand, since the delivery end of the stacker feeds other stack handling devices, it is convenient that the feed from this delivery end be absolutely regular, since the rejections of the incomplete stacks cause a feed discontinuity which disturbs the operation of these latter devices.

There arises, therefore, the problem of obtaining a stacking system which allows to always provide at the stacker delivery end absolutely regular stacks, with the absolut certainty that there will be no incomplete stacks to be rejected.

This invention is aimed at solving this problem and, for this purpose, it proposes a method for forming stacks of numbered packs or the like, according to which a stack of a number n of packs is formed in a stacking station, by stacking n−1 packs from the channel of arrival which feeds the stacking plunger, and by completing the stack with a pack, supplied from a magazine which is positioned above the stacking station, the control for the transfer of such a stack being caused to depend on the double check of the magazine and of the stack formed by the stacking plunger, so as to obtain in each case the certainty of the regularity of the stack to be transferred.

Consequently the invention proposes a stacker of packs or the like, using the above method, and comprising a frame for a vertical stacking station, surmounted by a magazine, with a reciprocating pusher for stacking from the bottom the packs from a channel which conveys them to the bottom of the station, and with a plunger transferring the predetermined stack from the station to an outlet of the same station, the stacking pusher and the transferring plunger being both operated by a common drive shaft through reduction gears or chain drives and reciprocating cam drives, the action of the transferring plunger being subordinated to the consent of photoelectric cell checking means which sense the filling condition of the magazine and the partial completion condition of the stack being formed.

These and other features of the invention and the resulting advantages, will be apparent from the following description of a preferred embodiment made with reference to the attached drawings.

BRIEF DESCRIPTION OF THE DRAWINGS

FIG. 2 is a diagrammatic side elevation, with sectioned parts, of the apparatus illustrated in FIG. 1; and, FIG. 3 is a diagrammatic front view of the stacking station and of the overlying magazine.

DESCRIPTION OF THE PREFERRED EMBODIMENT

Figure 1:
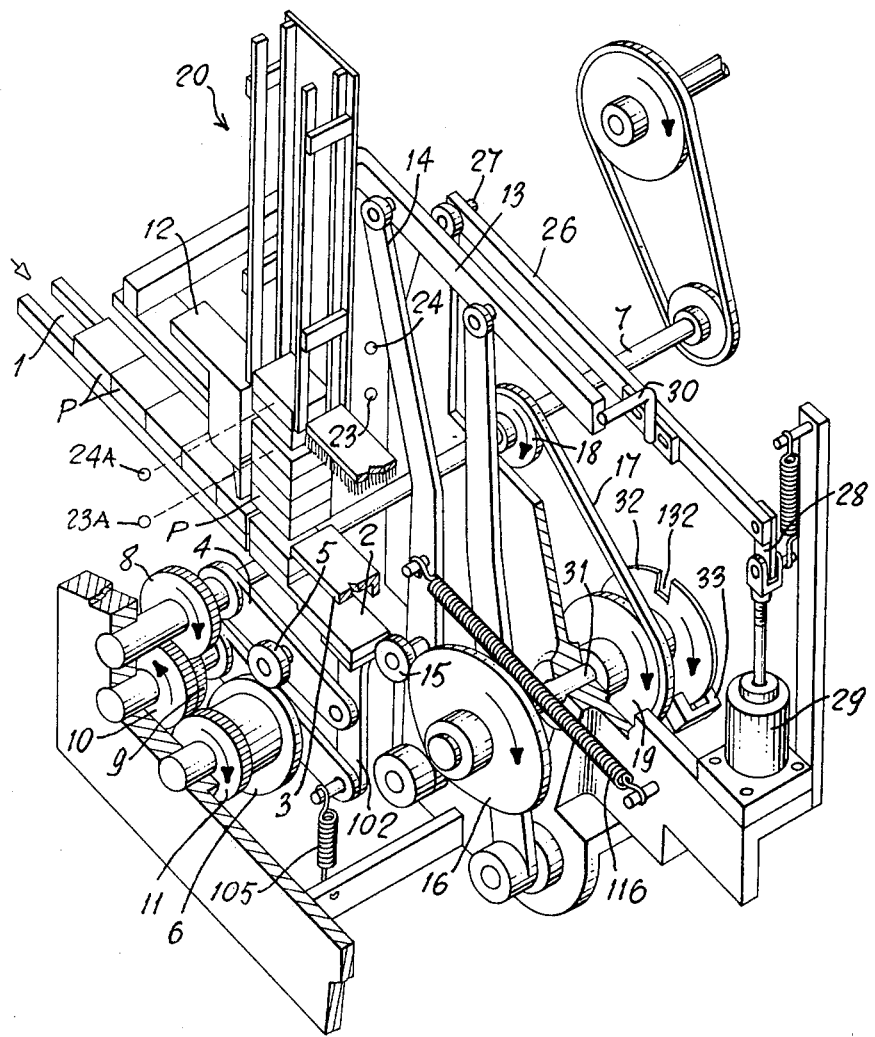
FIG. 1 is a perspective diagrammatic view illustrating an automatic stacker according to the invention.

With reference to the drawings, the embodiment illustrated relates to a stacker for forming stacks of five packs P each.

Packs P are sequentially fed from infeed channel 1 in which each pack moves towards the picking element of the stacking station, pushed by the row of packs moving behind it.

The leading pack comes to be in correspondence with the head of stacking plunger 2 and of stop 3 associated to it. Stem 102 of this plunger 2 constitutes the connecting rod of an articulated parallelogram, of the rocker type. A rocker lever 4 carries roller 5 which cooperates with cam 6 under the load of return spring 105.

Cam 6 is driven by drive shaft 7 through toothed gearing 8, 9, 10, 11.

Transferring plunger 12 is integral with connecting rod 13 of a second articulated parallelogram of the rocker type. Rocker lever 14 carries a follower 15 cooperating with cam 16 under the load of return spring 116. Also cam 16 is driven by shaft 7 through chain drive 17 between pinions 18 and 19.

The ratios between the drives from shafts 7 to cams 6 and 16 respectively are such that cam 16 makes one revolution every four revolutions of cam 6.

This means that transferring plunger 12 accomplishes one stack-transferring stroke every four strokes of stacking plunger 2.

The stacking station, in which the stacking plunger 2 acts vertically from the bottom, while transferring plunger 12 acts crosswise in a higher area, consists of a magazine 20 which accomplishes also the function of reserve magazine for dispensing the packs required for completing the stacks.

Walls 120 of magazine 20 have slots 220 and 230 engaged by spring detent teeth 21 and 22. Teeth 21 are used to hold the packs in the magazine as they are gradually raised in the magazine itself, while teeth 22 are used to hold the packs in the upper part of magazine 20 which performs the functions of reserve magazine for dispensing the packs for completing the stacks.

An optical-electronic level sensor comprising a photosensitive element 23 and a light source 23A, detects the state of completeness of the pack stack formed by stacking plunger 2, while another snesor comprising photosensitive element 24 and light source 24A is provided in order to detect the presence of the reserve packs in the stock magazine.

Cooperating with the above pairs of detectors 23—23A and 24—24A there is provided a locking device for the transferring plunger 12. This locking device comprises a lever 26, of which an end is hinged at a fixed point 27, while the other end is hinged, by means of link 28, to the fork of the stem of electromagnet 29.

Lever 26 presents a latch 30 which locks the transferring plunger 12, against its working stroke.

When electromagnet 29 is energized, latch 30 disengages the end of connecting rod 13, thus releasing transferring plunger 12.

The energization of electromagnet 29 depends on photoelectric cells 23 and 24 and on a strobe consisting of a proximity switch 33, associated to a stroboscopic disk 32 having a sensor slot 132, which is operatively active on said switch 33. Disk 32 is mounted on drive shaft 31 having a cam 16 which regulates the actuation of transferring plunger 12. The above coincidence strobe operates as follows. Every time slot 132 of disk 32 gets in the area of proximity switch 33, transferring plunger 12 is ready to start its transfer stroke. However, the effectuation of this stroke is subordinated to the position of latch 30 and depends, consequently, on the state of energization of electromagnet 29: if this is de-energized, as is the case of FIG. 1, latch 30 abuts against connecting rod 13 and thus locks the stroke of transferring plunger 12; the consent to this stroke involves the disengagement of the connecting rod latch and consequently the energization of electromagnet 29.

This energization, at the moment of the stroboscopic scanning of slot 132 on switch 33, depends, however, on the fact that, in that moment, both photoelectric cells 23, 24 are not illuminated by the beam of the light source 23A, 24A.

If this condition exists, it permits the energization of electromagnet 29 which allows plunger 12 to accomplish a transfer stroke. If, however, even just one of the photoelectric cells 23, 24 receives the light beam from the corresponding light source, this means that, either the stack made by the stacker is incomplete or the upper reserve packs are missing.

Both these conditions, even if considered individually, must exclude the release of the transferring plunger, which would transfer an irregular stack.

Consequently, the state of energization of one of the photocells 23, 24, or the other, or of both, at the scanning moment, inhibits the energization of electromagnet 29.

The electric circuits which connect photocells 23, 24, proximity switch 33 and electromagnetic 29 so as to satisfy the above described operational logic, are well known in the technique, and consequently it is not necessary to give here an example of them, because they are obvious to any person skilled in the art.

When the empty stacker apparatus is started the stacking plunger 2 forms a stack of four packs, which would be regular for the transfer. However, this transfer does not occur, because the reserve magazine is still empty, and consequently, for the reason previously explained, transferring plunger 12 remains locked. Under these conditions, stacking plunger 2 goes on operating, stacking other four packs, which push the preceding four in the reserve magazine. The condition of pack presence also in the reserve magazine is satisfied, so that the discharge or transfer consent can be given with the energization of electromagnet 29 and the consequent moving of latch 30 in release position. When released, plunger 12 transfers in delivery channel 34 the four packs resting on detent teeth 21, as well as the pack resting directly on detent teeth 22, the whole corresponding to a stack of five packs.

Consequently, at this point, there will remain in the reserve magazine three stacked packs, for the following three stacking cycles.

When also these three cycles are completed, the magazine will be empty and stacker 2 will then accomplish a re-loading cycle, which occurs automatically because transferring plunger 12 is locked.

The head of the transferring plunger 12 is provided with an oscillating pusher 35 (FIG. 2) which can freely oscillate backward, during the transferring plunger return stroke. This arrangement allows the stacking plunger to stack the first pack before the transferring plunger has effected its return stroke. In fact, the oscillating pusher, due to its possibility of oscillating backward, can slide on the first pack.

From the above, it appears evident that the invention purposes a method and apparatus for stacking regular articles, such as cigarette packs, in regular stacks of n packs according to which n−x packs are stacked, from the bottom, directly from a feed path along which the packs are caused to move in a row, while the remaining complement of x packs to the stack n, is supplied by a reserve magazine, aligned vertically and lying over the stacking station. Preferably, stacks of n−1 pieces are directly formed while the reserve magazine supplies every time the remaining one pack for completion.

It is understood that the invention is not limited to the embodiment which has been illustrated and described, but can be broadly changed and modified, particularly in its details of construction and operation.

I claim:

1. A method for forming a stack of a predetermined number "N" of packets by removing sidewise in horizontal direction a stack of "N" packets from a vertical magazine into which the packets are fed the one superposed to the other, wherein the improvement resides in the fact that a number of "N+M" packets are fed, in a known manner, the one after the other from below into the said vertical magazine, and subsequently only the "N" packets which are located lowermost in the magazine are removed sidewise to obtain the desired stack of "N" packets, while the remaining "M" packets remain in the upper section of the magazine so as to build a packet reserve from which a number of "X" of lowermost packets is removed at the subsequent stack-forming operation, together with a number of "N−X" packets which in the meantime have been fed from below into the said vertical magazine.

2. A method according to claim 1, in which, at each stack-forming operation, one packet is removed from the packet reserve in the upper section of the magazine, together with a number of "N−1" packets fed from below into the magazine.

3. An apparatus for forming a stack of a predetermined number "N" of packets, comprising a vertically movable stacking plunger which receives laterally the packets and feeds them, the one after the other, into an overlying vertical magazine, so as to build a pile of superposed packets which is supported by lower packet-supporting means arranged in correspondence of the bottom end of the magazine, and a transferring plunger movable to-and-fro in horizontal direction through the said vertical magazine, said transferring plunger presenting a pusher head which extends for a height of "N" packets above the lower packet-supporting means, upper packet-supporting means being provided arranged at the height of "N−1" packets above the lower packet-supporting means, whereby, at each stack-forming stroke, the transferring plunger pushes sidewise out of the vertical magazine a pile of "N" packets, consisting of "N−1" packets located in the magazine between the lower and the upper packet-supporting means, plus one packet from the packet reserve resting over the upper packet-supporting means.

4. An apparatus according to claim 3, in which the upper and lower packet-supporting means consist of detent teeth which project at the interior of the vertical magazine and are arranged at both sides of the horizontal path of movement of the transferring plunger, said teeth being elastically urged to their detent position, and presenting lower inclined surfaces so as to permit the upward movement of the packets fed by the vertical stacking plunger.

5. An apparatus according to claim 3, in which sensor means are provided which sense the presence of a packet in the magazine at a level immediately above and of a packet at a level immediately below the upper packet-supporting means, said sensor means controlling a consent circuit which controls the horizontal movement of the transferring plunger.

* * * * *